(12) United States Patent
Nishimoto et al.

(10) Patent No.: US 11,940,681 B2
(45) Date of Patent: Mar. 26, 2024

(54) DISPLAY DEVICE COMPRISING A CLAMPING MEMBER CLAMPING AN OUTER EDGE OF A FRONT PLATE AND AN OUTER EDGE OF A SUPPORT MEMBER

(71) Applicant: Japan Display Inc., Tokyo (JP)

(72) Inventors: Takuya Nishimoto, Tokyo (JP); Hiroki Sugiyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/839,830

(22) Filed: Jun. 14, 2022

(65) Prior Publication Data

US 2022/0404657 A1     Dec. 22, 2022

(30) Foreign Application Priority Data

Jun. 21, 2021   (JP) ................. 2021-102679

(51) Int. Cl.
*G02F 1/1333*   (2006.01)

(52) U.S. Cl.
CPC .... *G02F 1/13332* (2021.01); *G02F 1/133314* (2021.01)

(58) Field of Classification Search
CPC ................................................ G02F 1/133328
See application file for complete search history.

(56) References Cited

U.S. PATENT DOCUMENTS

| 2014/0240961 A1 | 8/2014 | Tsubaki et al. | |
|---|---|---|---|
| 2015/0131325 A1* | 5/2015 | Kokusho | G02F 1/133308 362/633 |
| 2015/0355495 A1* | 12/2015 | Yoon | G02F 1/133308 349/58 |

FOREIGN PATENT DOCUMENTS

| CN | 101082719 A | * 12/2007 | ....... G02F 1/133308 |
|---|---|---|---|
| CN | 101261789 A | * 9/2008 | ....... G02F 1/133308 |
| JP | 2014-164276 A | 9/2014 | |
| JP | 2017-103168 A | 6/2017 | |

\* cited by examiner

*Primary Examiner* — Paul C Lee
(74) *Attorney, Agent, or Firm* — K&L Gates LLP

(57) ABSTRACT

A display device includes a front plate, a display panel disposed on a back surface side of the front plate, a backlight disposed on a back surface side of the display panel, a housing that accommodates the backlight, a support member disposed on the back surface side of the front plate and outside the housing, the support member supporting the front plate, and a clamping member clamping an outer edge of the front plate and an outer edge of the support member.

6 Claims, 16 Drawing Sheets

DISPLAY DEVICE COMPRISING A CLAMPING MEMBER CLAMPING AN OUTER EDGE OF A FRONT PLATE AND AN OUTER EDGE OF A SUPPORT MEMBER

CROSS-REFERENCE TO RELATED APPLICATION

This application claims the benefit of priority from Japanese Patent Application No. 2021-102679 filed on Jun. 21, 2021, the entire contents of which are incorporated herein by reference.

BACKGROUND

1. Technical Field

The present disclosure relates to a display device.

2. Description of the Related Art

A transmissive liquid crystal display device displays images on a display panel using light from a backlight disposed on the back surface side of the display panel.

The liquid crystal display device includes, for example, a cover glass (front plate), a liquid crystal panel (display panel) located on the back surface side of the cover glass, and a backlight located on the back surface side of the liquid crystal panel. A cover glass support case (support member) is disposed outside the liquid crystal panel and the backlight. The back surface of the cover glass is bonded to the front surface of the cover glass support case.

Display devices having front plates less likely to become detached from support members are desired.

An object of the present disclosure is to provide a display device having a front plate less likely to become detached from a support member.

SUMMARY

A display device according to an embodiment of the present disclosure includes a front plate, a display panel disposed on a back surface side of the front plate, a backlight disposed on a back surface side of the display panel, a housing that accommodates the backlight, a support member disposed on the back surface side of the front plate and outside the housing, the support member supporting the front plate, and a clamping member clamping an outer edge of the front plate and an outer edge of the support member.

DETAILED DESCRIPTION

Figure 1:
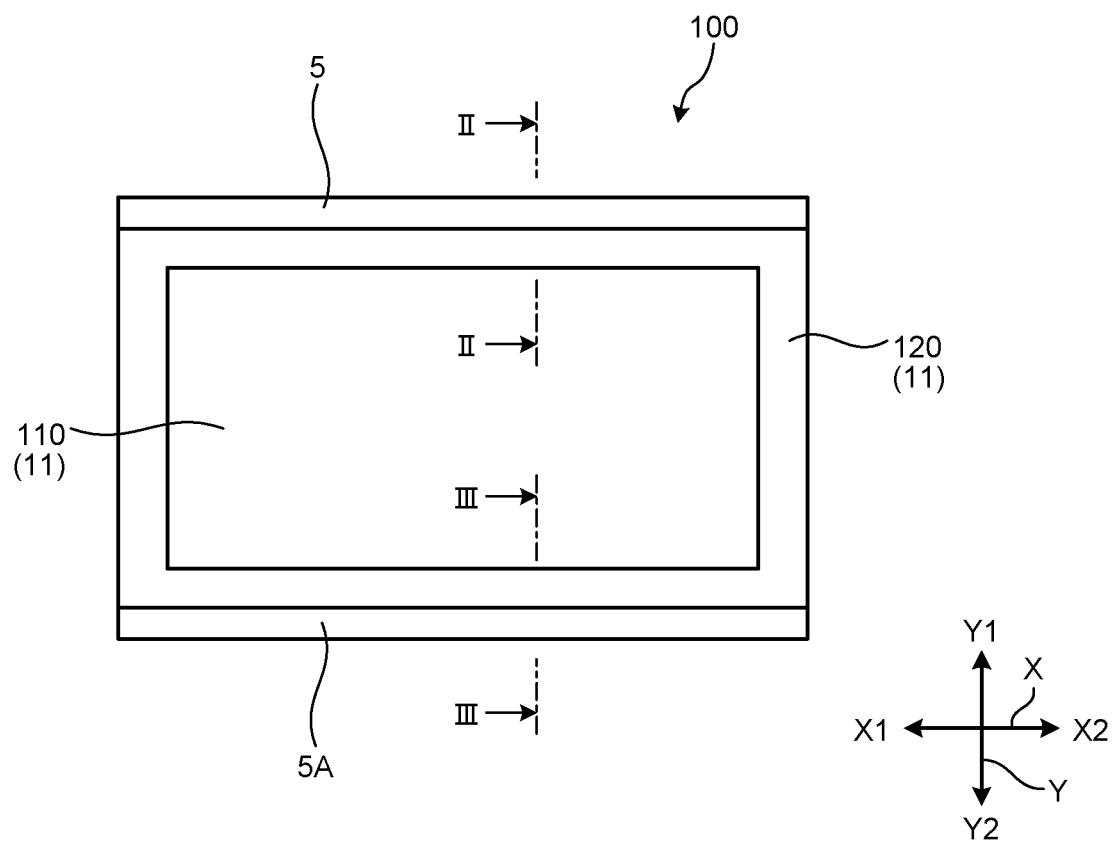
FIG. 1 is a front view of a display device according to a first embodiment.

Modes for carrying out the present disclosure (embodiments) will be described in detail with reference to the drawings. The present disclosure is not intended to be limited by the description of the following embodiments. The constituent elements described below include those that can be easily conceived by a person skilled in the art and those that are substantially the same. The constituent elements described below can be combined as appropriate.

The disclosure is merely an example, and any modifications that can be easily conceived by a person skilled in the art without departing from the spirit of the disclosure should be embraced in the scope of the disclosure. In the drawings, the width, the thickness, the shape, and the like of each part are sometimes schematically drawn compared with actual embodiments, for clarity of description. However, such drawings are illustrated only by way of example and should not be construed as limiting the interpretation of the present disclosure. In this specification and the drawings, elements similar to those previously described in conjunction with the drawings already described may be denoted by the same reference signs, and a detailed description thereof may be omitted if appropriate.

In three-dimensional coordinates, the X direction indicates the left-right direction, the Y direction indicates the up-down direction, and the Z direction indicates the front-rear (front-back) direction. The X1 side indicates the left side and the X2 side indicates the right side. The Y1 side indicates the upper side and the Y2 side indicates the lower side. The Z1 side indicates the front side (front surface side) and the Z2 side indicates the rear side (back surface side). Thus, in the following description, for example, the left side may be referred to as the X1 side, and the front side may be referred to as the Z1 side.

First Embodiment

Figure 2:
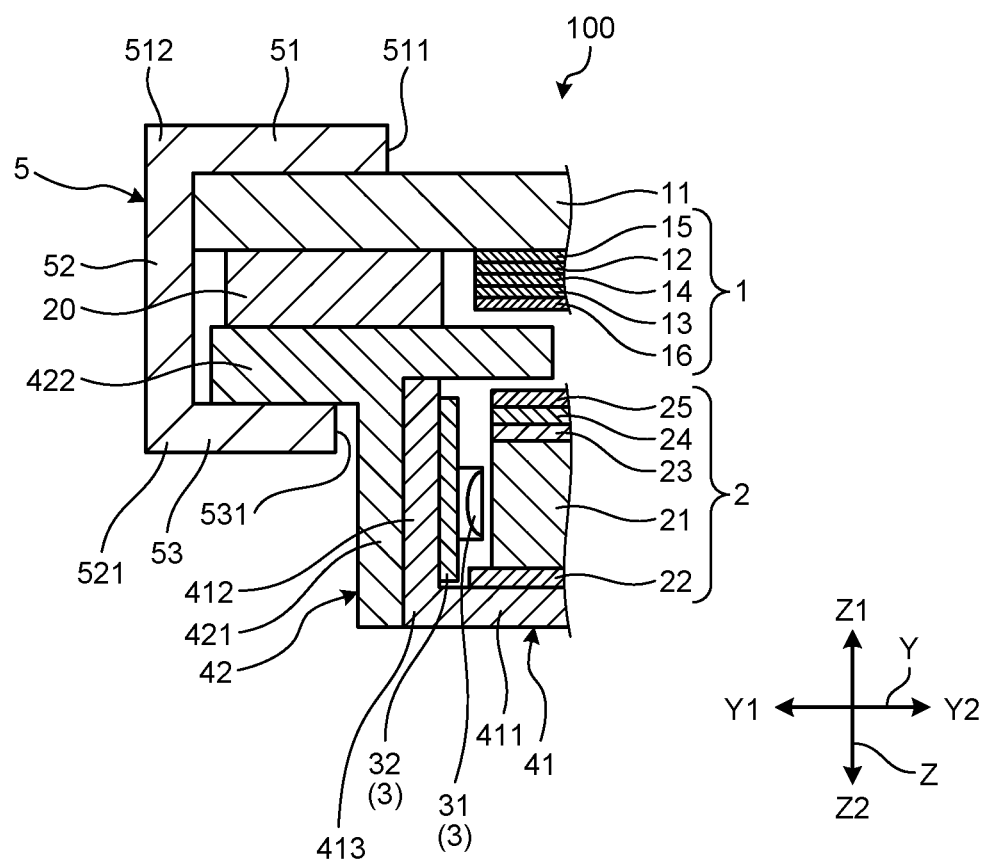
FIG. 2 is a cross-sectional view taken along line II-II in FIG. 1.
Figure 3:
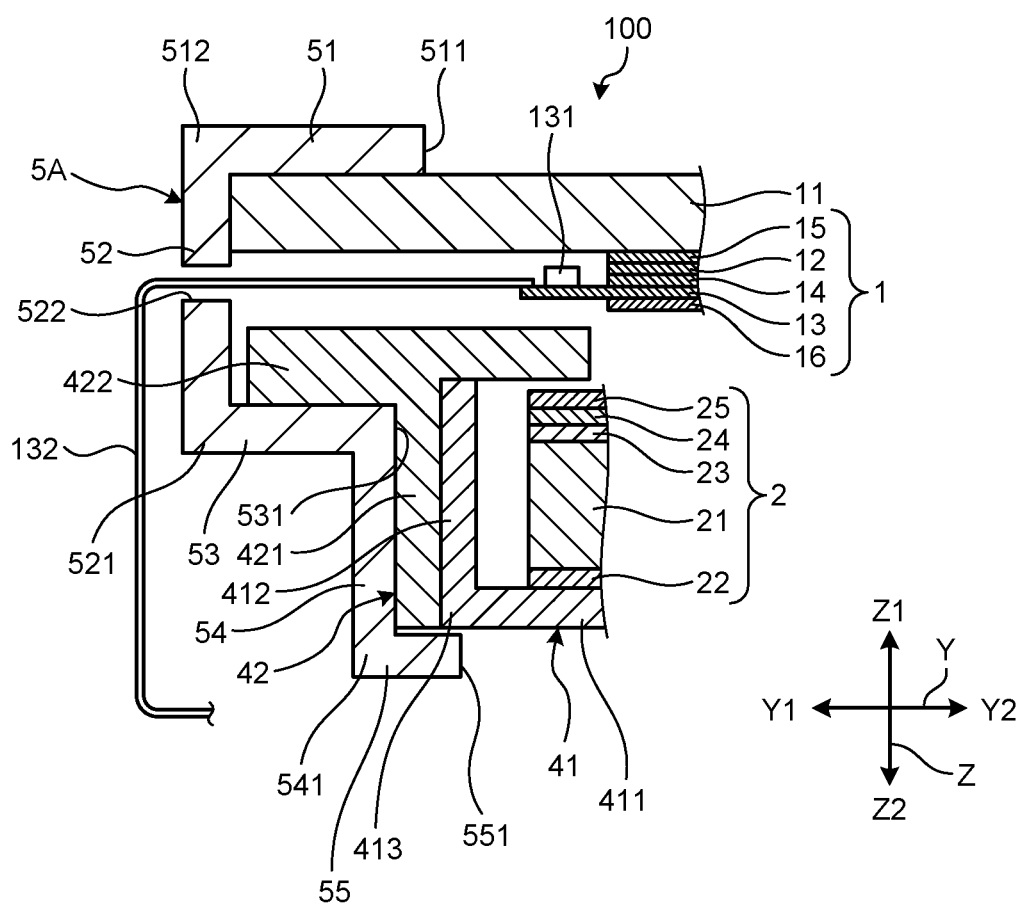
FIG. 3 is a cross-sectional view taken along line III-III in FIG. 1.

FIG. 1 is a front view of a display device according to a first embodiment. FIG. 2 is a cross-sectional view taken along line II-II in FIG. 1. FIG. 3 is a cross-sectional view taken along line III-III in FIG. 1.

As illustrated in FIG. 1, a display panel 1 includes a light-transmitting part 110 and a light-shielding part 120 disposed outside the light-transmitting part 110. The light-transmitting part 110 is a display region of a display device 100, and the light-shielding part 120 is a frame region of the display device 100.

As illustrated in FIG. 2 and FIG. 3, the display device 100 of the first embodiment includes a front plate 11, the display panel 1, a backlight 2, a light source 3, a housing 41, a support member 42, and a clamping member 5. The display device 100 displays images, for example, by modulating light emitted from the backlight 2 with the display panel 1. In the first embodiment, the front plate 11, the display panel 1, and the backlight 2 have a flat shape. That is, the positions of the front plate 11, the display panel 1, and the backlight 2 in the Z direction are constant toward the X direction.

The outer edge of the front plate 11 is fixed to the support member 42 with a seal member 20 interposed therebetween. The front plate 11 is a member for protecting the display device 100 and covers the display device 100. The front plate 11 is, for example, a glass substrate or a resin substrate.

As illustrated in FIG. 2 and FIG. 3, the display panel 1 is provided on the back surface side of the front plate 11. The display panel 1 includes a first substrate 12, a second substrate 13, a liquid crystal layer 14, a first polarizer 15, and a second polarizer 16. The display panel 1 is a plate-shaped member and, for example, has a rectangular shape in a two-dimensional view. As illustrated in FIG. 2, the light source 3 is provided at the Y1-side end of the display device 100. The light source 3 is elongated and extends along the X direction. As illustrated in FIG. 3, a driver integrated circuit (IC) 131 and a flexible printed circuit board (FPC) 132 are provided at the Y2-side end of the display device 100 as described later.

As illustrated in FIG. 2 and FIG. 3, the first polarizer 15, the first substrate 12, the liquid crystal layer 14, the second substrate 13, and the second polarizer 16 are stacked in this order on the rear side (Z2 side, back surface side) of the front plate 11. Specifically, the first polarizer 15 is disposed on the rear side (back surface side) of the front plate 11. The first substrate 12 is disposed on the rear side (back surface side) of the first polarizer 15. The liquid crystal layer 14 is disposed on the rear side (back surface side) of the first substrate 12. The second substrate 13 is disposed on the rear side (back surface side) of the liquid crystal layer 14. The second polarizer 16 is disposed on the rear side (back surface side) of the second substrate 13.

As illustrated in FIG. 3, the second substrate 13 of the display panel 1 protrudes toward the Y1 side, and the driver IC 131 is mounted on the protruding portion. The driver IC 131 is electrically coupled to the FPC 132 through a not-illustrated electrode.

The clamping member 5 has a through hole 522 at a third section 52 described later. The FPC 132 passes through the through hole 522 and extends along the side surfaces of the third section 52, a second section 53, and a fourth section 54 of the clamping member 5.

Light emitted from the backlight 2 toward the front side (Z1 side, front surface side) is transmitted through the second polarizer 16 and the second substrate 13 and incident on the liquid crystal layer 14, and modulated by the liquid crystal layer 14. Light modulated by the liquid crystal layer 14 is transmitted through the first substrate 12, the first polarizer 15, and the front plate 11 and recognized as an image. The second polarizer 16 converts light emitted from the backlight 2 into linearly polarized light. The first polarizer 15 transmits or blocks light depending on a state of orientation (the amount of modulation) of the liquid crystal layer 14.

The backlight 2 is a plate-shaped member and, for example, has a rectangular shape in a two-dimensional view. The backlight 2 includes, for example, a light guide plate 21, a reflective sheet 22, a first lens sheet 23, a second lens sheet 24, and a diffusion sheet 25.

In the backlight 2, the diffusion sheet 25, the second lens sheet 24, the first lens sheet 23, the light guide plate 21, and the reflective sheet 22 are stacked in this order. Specifically, the second lens sheet 24 is disposed on the rear side (back surface side) of the diffusion sheet 25. The first lens sheet 23 is disposed on the rear side (back surface side) of the second lens sheet 24. The light guide plate 21 is disposed on the rear side (back surface side) of the first lens sheet 23. The reflective sheet 22 is disposed on the rear side (back surface side) of the light guide plate 21.

The first lens sheet 23 and the second lens sheet 24 enhance the directivity of light emitted from the front surface of the light guide plate 21. The diffusion sheet 25 moderately diffuses the light with directivity enhanced by the first lens sheet 23 and the second lens sheet 24. The reflective sheet 22 reflects light leaking from the light guide plate 21 to allow the reflected light to enter the light guide plate 21. The reflective sheet 22 is, for example, foamed polyethylene terephthalate (PET). The reflective sheet 22 may be, for example, a silver-deposited film, a multilayered reflective film, or white PET. The reflective sheet 22, the first lens sheet 23, the second lens sheet 24, and the diffusion sheet 25 are provided as necessary and may be omitted.

As illustrated in FIG. 2, the light source 3 is disposed on the Y1-side side of the light guide plate 21. In other words, the light source 3 is disposed to face a side surface of the light guide plate 21 so that light is incident from the side surface of the light guide plate 21. The light source 3 may be composed of a plurality of light emitters (such as light emitting diodes (LEDs)) spaced apart from each other and disposed along the X direction or may be a single linear light emitter (such as a cold cathode ray tube) extending along the X direction.

In the present embodiment, the light source 3 includes, for example, a plurality of light emitters 31 and a mounting substrate 32. In the present embodiment, the light emitters 31 are LEDs. The light emitters 31 are mounted on the mounting substrate 32.

As illustrated in FIG. 2 and FIG. 3, the housing 41 accommodates the backlight 2. The housing 41 is made of metal or resin. The metal may be, for example, a stainless steel sheet with a small thickness.

The housing 41 has a bottom portion 411 and a side portion 412. As illustrated in FIG. 2 and FIG. 3, the bottom portion 411 extends in the Y direction. The reflective sheet 22 is fixed to the bottom portion 411, for example, through a double-sided tape. The side portion 412 extends from an end 413 of the bottom portion 411 toward the front side (Z1 side, front surface side). The light emitters 31 are fixed to the side portion 412 with the mounting substrate 32 interposed therebetween.

The support member 42 has a leg 421 and a flange 422. The leg 421 extends in the front-rear direction (Z-direction, front-back direction). The leg 421 is located outside the side portion 412 of the housing 41. As illustrated in FIG. 2 and FIG. 3, the flange 422 extends along the front plate 11. The seal member 20 is provided on the front surface of the flange 422, and the outer edge of the front plate 11 is provided on the front surface of the seal member 20. In this way, the outer edge of the front plate 11 is supported by the flange 422 with the seal member 20 interposed therebetween.

As illustrated in FIG. 2 and FIG. 3, the outer edge of the front plate 11 and the outer edge of the flange 422 of the support member 42 are at least partially covered with the clamping members 5 and 5A. The outer edge is an end in the Y direction illustrated in FIG. 1. In the first embodiment, as illustrated in FIG. 1, the clamping member 5 is provided at the Y1-side end, and the clamping member 5A is provided at the Y2-side end.

As illustrated in FIG. 2, the clamping member 5 has a U-shaped cross section. The clamping member 5 is an elongated member extending linearly along the left-right direction (X direction). Specifically, the clamping member 5 has a first section 51, the third section 52, and the second section 53. The first section 51 is located on the front surface side of the outer edge of the front plate 11. The second section 53 is located on the back surface side of the flange 422. The third section 52 connects the first section 51 and the second section 53. That is, the first section 51 extends linearly in cross section from an end 311 on the Y2 side toward the Y1 side to an end 512. The third section 52 extends linearly in cross section from the end 512 on the Z1 side toward the Z2 side to an end 521. The second section 53 extends linearly in cross section from the end 521 on the Y1 side toward the Y2 side to an end 531. In FIG. 2 and FIG. 3, the first section 51 abuts on the front plate 11 but may be separate from the front plate 11. The second section 53 also abuts on the flange 422 of the support member 42 but may be separate from the flange 422.

The procedure for mounting the clamping member 5 on the front plate 11 and the support member 42 will be described briefly. For example, first, the X2-side end of the clamping member 5 illustrated in FIG. 1 is fitted to the X1-side ends of the front plate 11 and the flange 422. Next, the clamping member 5 is slid toward the X2 side along the X direction, whereby the clamping member 5 can be mounted on the front plate 11 and the support member 42.

As illustrated in FIG. 3, the clamping member 5A additionally has the fourth section 54 and a fifth section 55, compared with the clamping member 5. The clamping member 5A is an elongated member extending linearly along the left-right direction (X direction). Specifically, the clamping member 5A has the first section 51, the third section 52, the second section 53, the fourth section 54, and the fifth section 55. The fourth section 54 is coupled to the second section. The fourth section 54 is located outside the leg 421 of the support member 42. The fifth section 55 is coupled to the fourth section 54. The fifth section 55 is located on the back surface side of the leg 421. That is, the fourth section 54 extends linearly in cross section from an end 531 toward the Z2 side to an end 541. The fifth section 55 extends linearly in cross section from the end 541 toward the Y2 side to an end 551. The fifth section 55 is located on the Z2 side of the leg 421 of the support member 42 and the bottom portion 411 of the housing 41. As described above, the third section 52 has the through hole 522. The through hole 522 extends, for example, along the X direction from the X2-side end illustrated in FIG. 1 toward the X1 side. The X1-side end of the through hole 522 is, for example, a middle portion in the X direction in the clamping member 5A. That is, the through hole 522 is open at the X2-side end. However, in the present embodiment, the through hole 522 may be open at the X1-side end.

In the first embodiment, the clamping member 5 is provided at the Y1-side end, and the clamping member 5A is provided at the Y2-side end. However, the present disclosure is not limited thereto and any other various combinations can be employed. For example, the clamping member 5A may be provided at the Y1-side end, and the clamping member 5 may be provided at the Y2-side end. The clamping members 5 may be provided at both the Y1-side end and the Y2-side end, or the clamping members 5A may be provided at both of the Y1-side end and the Y2-side end.

As explained above, the display device 100 according to the first embodiment includes the front plate 11, the display panel 1 disposed on the back surface side of the front plate 11, the backlight 2 disposed on the back surface side of the display panel 1, the housing 41 that accommodates the backlight 2, the support member 42 disposed on the back surface side of the front plate 11 and outside the housing 41 and supporting the front plate 11, and the clamping members 5 and 5A that clamp the outer edge of the front plate 11 and the outer edge of the support member 42.

In the conventional display devices, the front plate is attached to the support member by bonding. In comparison, the display device 100 according to the first embodiment has the clamping members 5 and 5A to clamp the front plate 11 and the support member 42. In the present embodiment, therefore, the front plate 11 and the support member 42 are less likely to become detached, compared with the conventional display devices.

Since the outer edge of the support member 42 is the flange 422 extending along the front plate 11, the clamping members 5 and 5A easily clamp the front plate 11 and the support member 42.

The clamping members 5 and 5A each have the first section 51 located on the front surface side of the outer edge of the front plate 11, the second section 53 located on the back surface side of the flange 422, and the third section 52 connecting the first section 51 and the second section 53. Thus, the structure of the clamping members 5 and 5A is simplified, and the outer edge of the front plate 11 and the flange 422 can be clamped by the clamping members 5 and 5A having such a simple structure. The clamping members 5 and 5A have a plurality of bending portions and therefore have higher rigidity.

The clamping member 5A has the first section 51, the second section 53, the third section 52, the fourth section 54 coupled to the second section 53 and located outside the leg 421 of the support member 42, and the fifth section 55 coupled to the fourth section 54 and located on the back surface side of the leg 421.

In this way, the clamping member 5A further includes the fourth section 54 and the fifth section 55, compared with the clamping member 5. The clamping member 5A therefore can clamp the front plate 11 and the support member 42 more securely than the clamping member 5, so that the front plate 11 is even less likely to become detached from the support member 42.

First Modification

Figure 4:
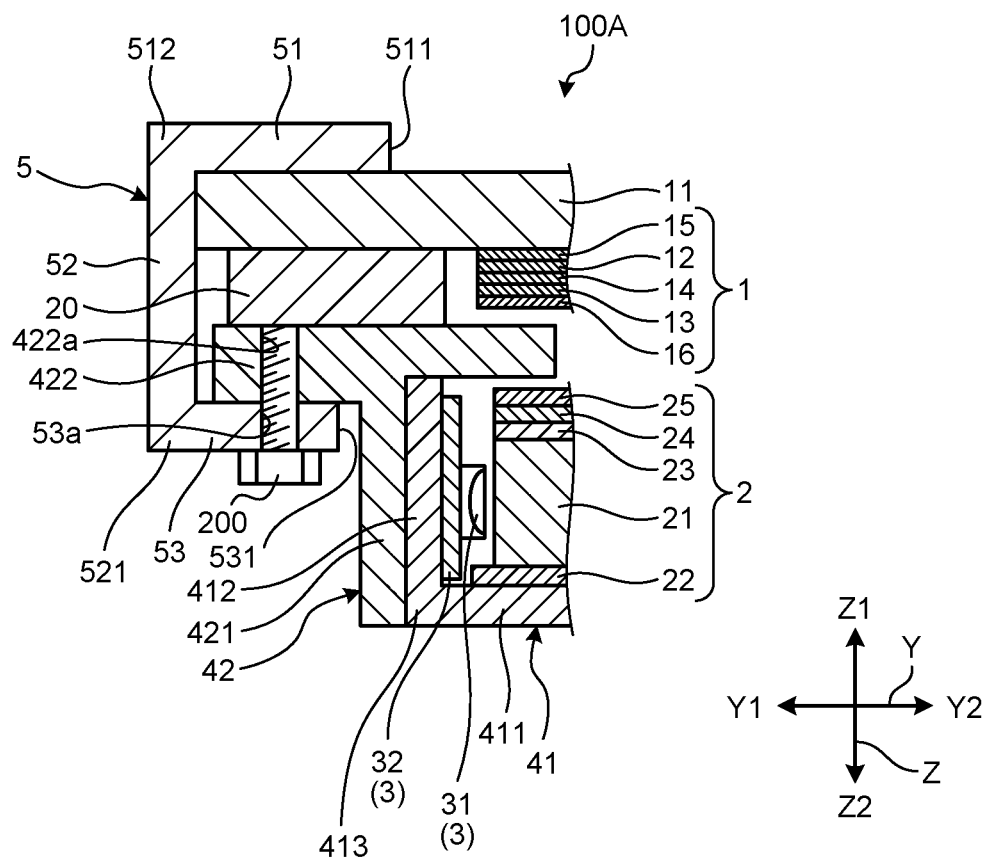
FIG. 4 is a cross-sectional view of a display device according to a first modification.

A first modification will now be described. FIG. 4 is a cross-sectional view of a display device according to the first modification. A display device 100A according to the first modification differs from the display device 100 according to the first embodiment in that it further includes a first joint mechanism including a bolt 200 and a bolt hole 422a. The detail will be described below.

As illustrated in FIG. 4, in the first modification, a clamping member 5 is provided at the Y1-side end of the display device 100A. The clamping member 5 has a first section 51, a third section 52, and a second section 53, and the second section 53 is fixed to the flange 422 of the support member 42 through the bolt 200.

The second section 53 has a through hole 53a. The through hole 53a allows the bolt 200 to pass therethrough. The flange 422 has the bolt hole 422a. The bolt hole 422a has a female thread on the inner periphery. The female thread meshes with a male thread of the bolt 200. In this configuration, the bolt 200 is inserted into the through hole 53a of the second section 53 and fastened to the bolt hole 422a of the flange 422, whereby the second section 53 of the clamping member 5 is fixed to the flange 422 of the support member 42.

As explained above, in the display device 100A according to the first modification, the second section 53 of the clamping member 5 is joined to the flange 422 through the first joint mechanism including the bolt 200 and the bolt hole 422a. This configuration can clamp the front plate 11 and the support member 42 more securely than in the first embodiment, so that the front plate 11 is even less likely to become detached from the support member 42.

Second Modification

Figure 5:
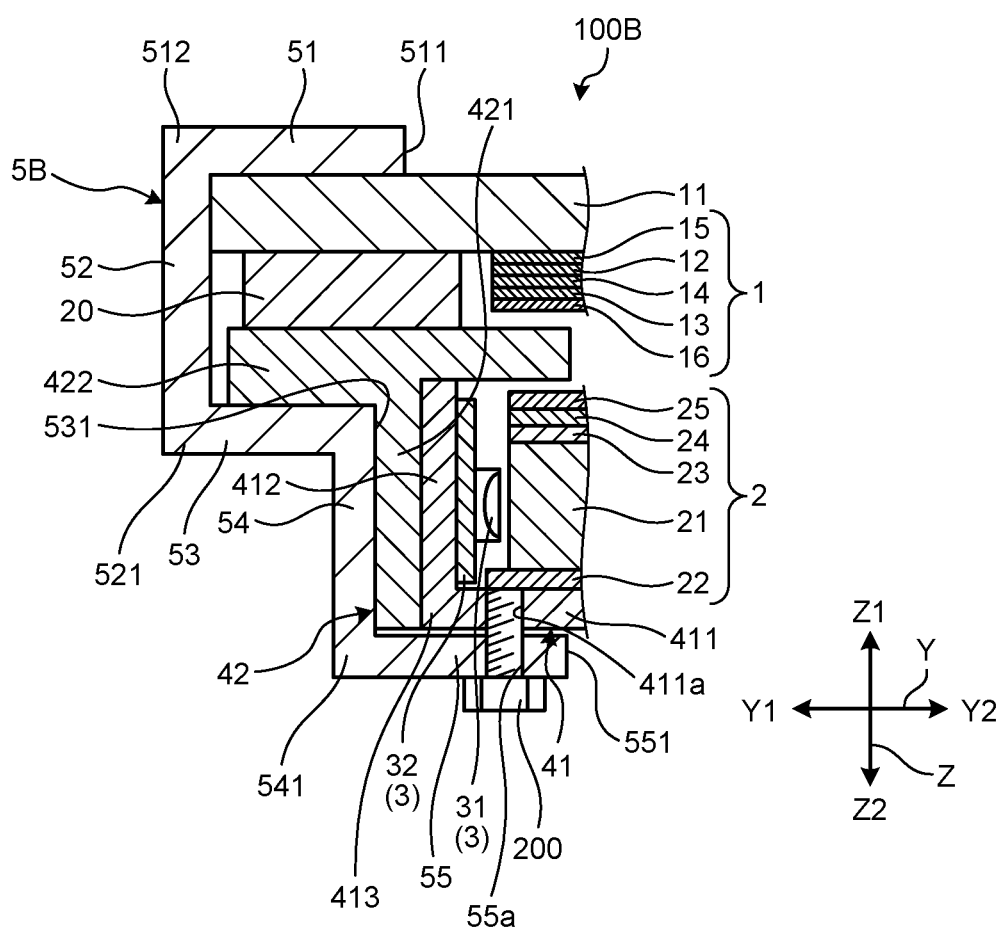
FIG. 5 is a cross-sectional view of a display device according to a second modification.

A second modification will now be described. FIG. 5 is a cross-sectional view of a display device according to the second modification. A display device 100B according to the second modification differs from the display device 100 according to the first embodiment in that it further includes a second joint mechanism including a bolt 200 and a bolt hole 411a. The detail will be described below.

In the second modification, a clamping member 5B is provided at the Y1-side end of the display device 100B. The clamping member 5B has a first section 51, a third section 52, a second section 53, a fourth section 54, and a fifth section 55, and the fifth section 55 is fixed to the bottom portion 411 of the housing 41 through the bolt 200.

The fifth section 55 has a through hole 55a. The through hole 55a allows the bolt 200 to pass therethrough. The bottom portion 411 of the housing 41 has the bolt hole 411a. The bolt hole 411a has a female thread on the inner periphery. The female thread meshes with a male thread of the bolt 200. In this configuration, the bolt 200 is inserted into the through hole 55a of the fifth section 55 and fastened to the bolt hole 411a of the bottom portion 411, whereby the fifth section 55 of the clamping member 5 is fixed to the bottom portion 411 of the housing 41.

As explained above, in the display device 100B according to the second modification, the fifth section 55 of the clamping member 5B is joined to the bottom portion 411 of the housing 41 through the second joint mechanism including the bolt 200 and the bolt hole 411a. This configuration can clamp the front plate 11 and the support member 42 more securely than in the first embodiment, so that the front plate 11 is even less likely to become detached from the support member 42.

Third Modification

Figure 6:
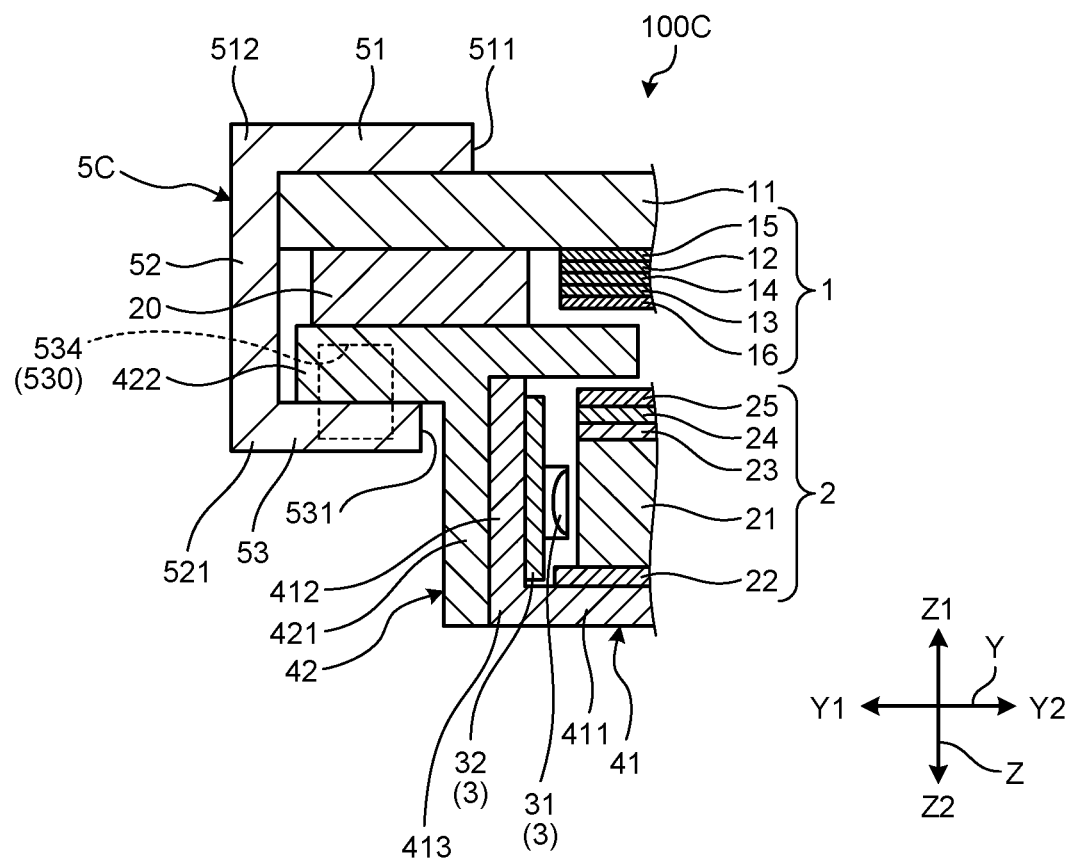
FIG. 6 is a cross-sectional view of a display device according to a third modification.
Figure 7:
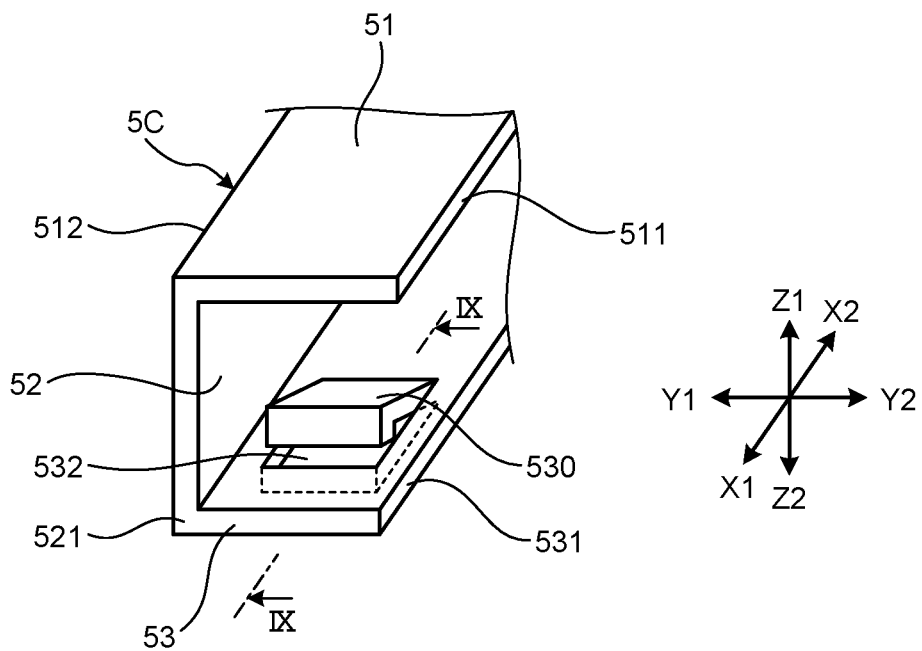
FIG. 7 is a perspective view of a clamping member according to the third modification.
Figure 8:
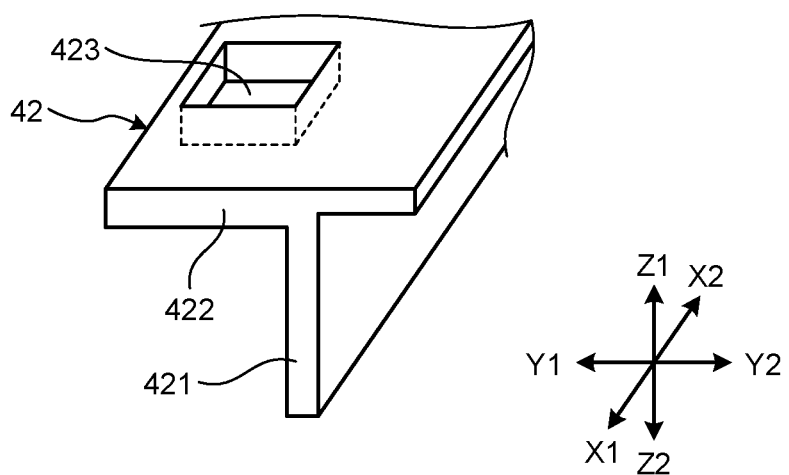
FIG. 8 is a perspective view of a housing according to the third modification.
Figure 9:
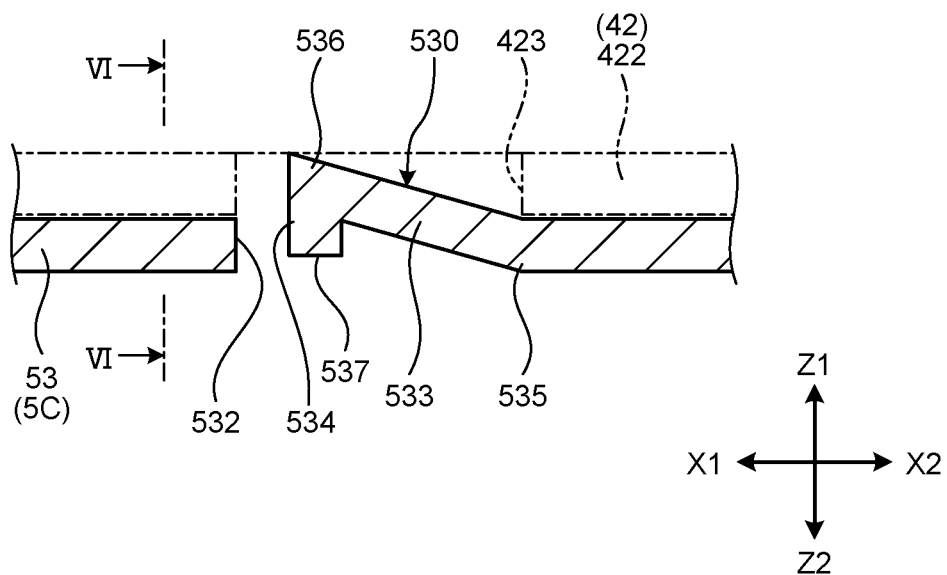
FIG. 9 is a cross-sectional view taken along line IX-IX in FIG. 7.

A third modification will now be described. FIG. 6 is a cross-sectional view of a display device according to the third modification. FIG. 7 is a perspective view of a clamping member according to the third modification. FIG. 8 is a perspective view of a second housing according to the third modification. FIG. 9 is a cross-sectional view taken along line IX-IX in FIG. 7. A display device 100C according to the third modification differs from the display device 100 according to the first embodiment in that it further includes a first joint mechanism including a first pawl 530 and a first through hole 423. The detail will be described below.

A clamping member 5C is provided at the Y1-side end of the display device 100C. As illustrated in FIG. 7, the clamping member 5C in the third modification has a first section 51, a third section 52, and a second section 53, and the second section 53 is joined to the flange 422 of the support member 42.

As illustrated in FIG. 6, FIG. 7, and FIG. 9, the first pawl 530 is provided at the second section 53, and an opening 532 is provided on the Z2 side of the first pawl 530. The first pawl 530 has a rectangular shape as viewed from the Z direction. As illustrated in FIG. 9, the first pawl 530 has a pawl body 533 and a bending portion 534. The pawl body 533 extends from an end 535 toward the X1 side to an end 536. Specifically, the pawl body 533 is inclined to come closer to the Z1 side from the end 535 toward the X1 side. The bending portion 534 extends from the end 536 toward the Z2 side. The first pawl 530 swings in the Z direction with the end 535 as a base point. The second section 53 has the rectangular opening 532. Since the opening 532 is larger than the first pawl 530, the opening 532 does not interfere with swinging of the first pawl 530.

As illustrated in FIG. 8 and FIG. 9, the first through hole 423 is provided in the flange 422 of the support member 42. The first through hole 423 has substantially the same shape and size as the opening 532. As illustrated in FIG. 9, when the first pawl 530 swings, the first pawl 530 can be partially accommodated in the first through hole 423. In this way, the first pawl 530 is partially fitted into the first through hole 423, whereby the second section 53 is joined to the flange 422 of the support member 42.

As explained above, in the display device 100C according to the third modification, the second section 53 of the clamping member 5C is joined to the flange 422 through the first joint mechanism including the first pawl 530 and the first through hole 423. This configuration can clamp the front plate 11 and the support member 42 more securely than in the first embodiment, so that the front plate 11 is even less likely to become detached from the support member 42. In particular, in the third modification employing the first pawl 530 having a shape illustrated in FIG. 9, the clamping member 5C is slid toward the X2 side in FIG. 9, whereby the first pawl 530 swings with the end 535 as a starting point while being elastically deformed in the Z direction. That is, in a state in which the end 536 of the first pawl 530 abuts on the flange 422, the first pawl 530 is pushed toward the Z2 side with the end 535 as a starting point, and when the first pawl 530 enters the first through hole 423, the first pawl 530, elastically deformed, moves toward the Z1 side with the end 535 as a starting point. The clamping member 5C can be easily removed from the display device 100C by further sliding the clamping member 5C toward the X2 side.

Fourth Modification

Figure 10:
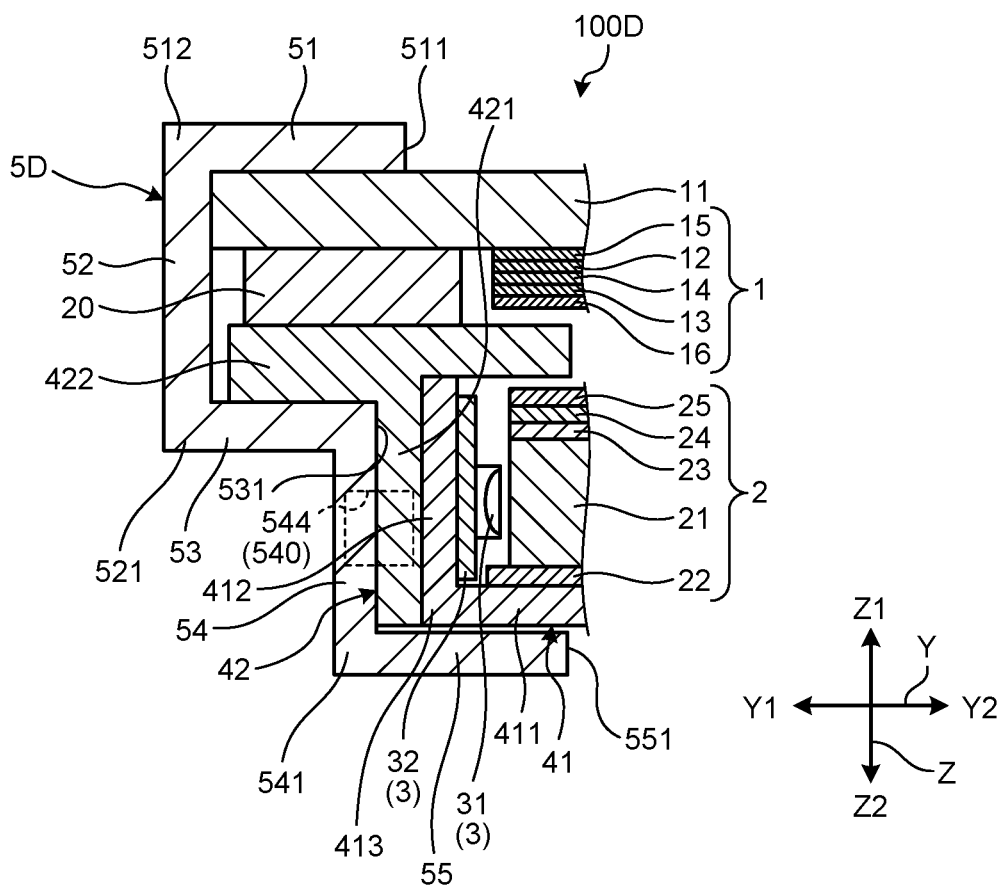
FIG. 10 is a cross-sectional view of a display device according to a fourth modification.
Figure 11:
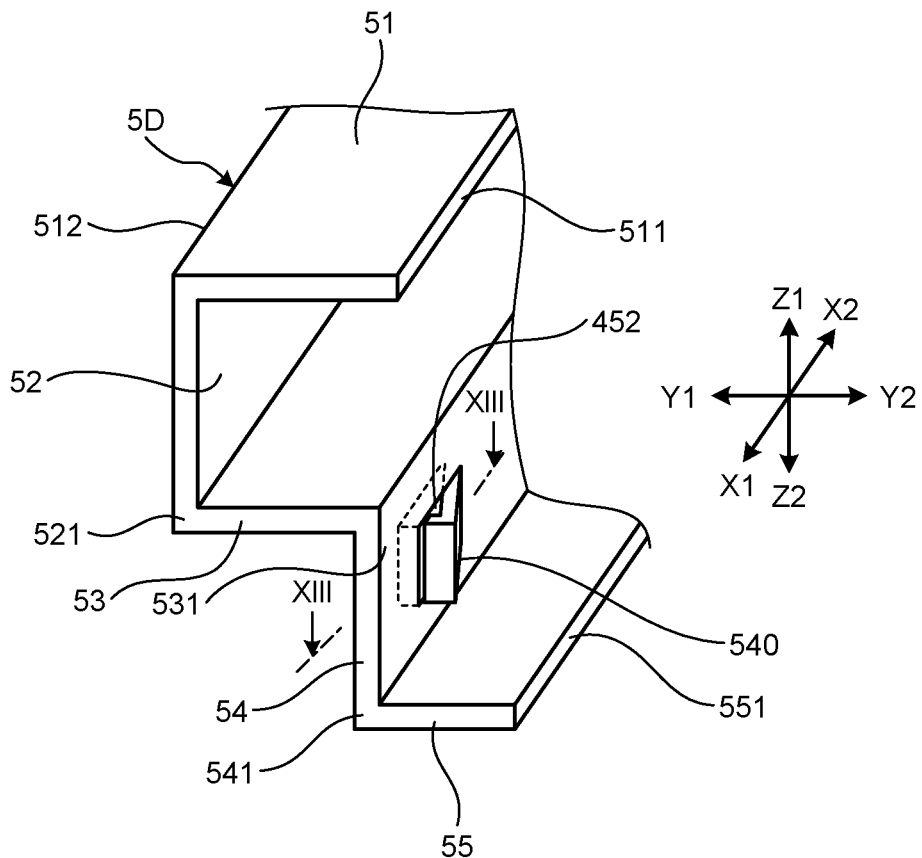
FIG. 11 is a perspective view of a clamping member according to the fourth modification.
Figure 12:
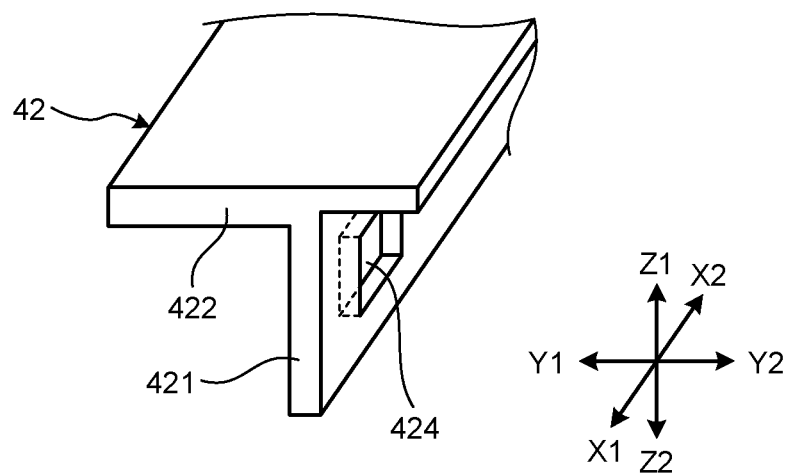
FIG. 12 is a perspective view of a housing according to the fourth modification.
Figure 13:
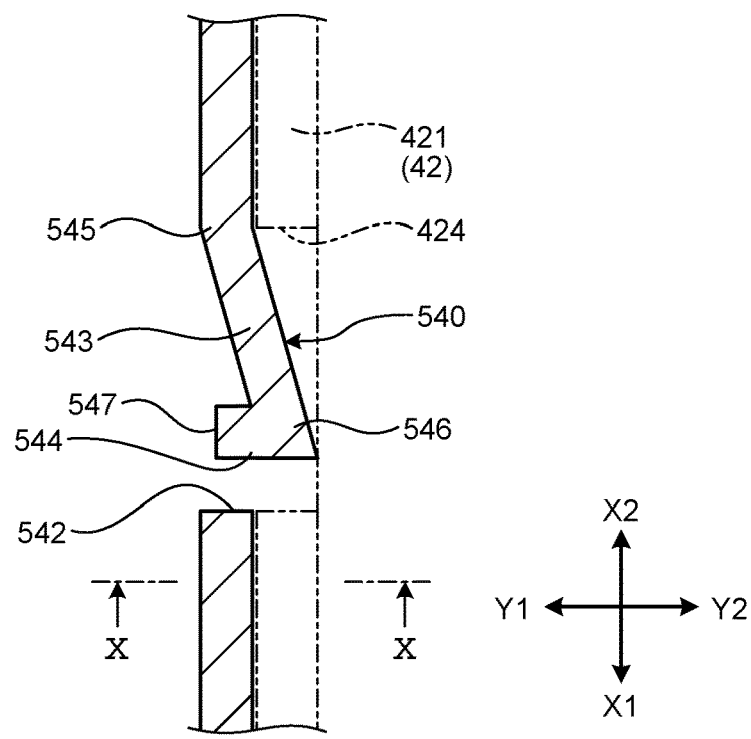
FIG. 13 is a cross-sectional view taken along line XIII-XIII in FIG. 11.

A fourth modification will now be described. FIG. 10 is a cross-sectional view of a display device according to the fourth modification. FIG. 11 is a perspective view of a clamping member according to the fourth modification. FIG. 12 is a perspective view of a second housing according to the fourth modification. FIG. 13 is a cross-sectional view taken along line XIII-XIII in FIG. 11.

A clamping member 5D is provided at the Y1-side end of a display device 100D. The display device 100D according to the fourth modification differs from the display device 100 according to the first embodiment in that it further includes a second joint mechanism including a second pawl 540 and a second through hole 424. The detail will be described below.

As illustrated in FIG. 11, the clamping member 5D in the fourth modification has a first section 51, a third section 52, a second section 53, a fourth section 54, and a fifth section 55, and the fourth section 54 is fixed to the leg 421 of the support member 42 through a snap-fit structure.

As illustrated in FIG. 11 and FIG. 13, the second pawl 540 is provided at the fourth section 54, and an opening 542 is provided on the Y1 side of the second pawl 540. The second pawl 540 has a rectangular shape as viewed from the Y direction. As illustrated in FIG. 13, the second pawl 540 has a pawl body 543 and a bending portion 544. The pawl body 543 extends from an end 545 toward the X1 side to an end 546. Specifically, the pawl body 543 is inclined to come closer to the Y2 side from the end 545 toward the X1 side. The bending portion 544 extends from the end 546 toward the Y1 side. The second pawl 540 swings in the Y direction with the end 545 as a base point. The fourth section 54 has a rectangular opening 542. Since the opening 542 is larger than the second pawl 540, the opening 542 does not interfere with swinging of the second pawl 540.

As illustrated in FIG. 12 and FIG. 13, the second through hole 424 is provided in the leg 421 of the support member 42. The second through hole 424 has substantially the same shape and size as the opening 542. As illustrated in FIG. 13, when the second pawl 540 swings, the second pawl 540 can be partially accommodated in the second through hole 424. In this way, the second pawl 540 is partially fitted into the second through hole 424, whereby the fourth section 54 is joined to the leg 421 of the support member 42.

As explained above, in the display device 100D according to the fourth modification, the fourth section 54 of the clamping member 5D is joined to the leg 421 through the second joint mechanism including the second pawl 540 and the second through hole 424. This configuration can clamp the front plate 11 and the support member 42 more securely than in the first embodiment, so that the front plate 11 is even less likely to become detached from the support member 42. In particular, in the fourth modification employing the second pawl 540 having a shape illustrated in FIG. 13, the clamping member 5D is slid toward the X2 side in FIG. 13, whereby the second pawl 540 swings with the end 545 as a starting point while being elastically deformed in the Y direction. That is, in a state in which the end 546 of the second pawl 540 abuts on the leg 421, the second pawl 540 is pushed toward the Y1 side with the end 545 as a starting point, and when the second pawl 540 enters the second through hole 424, the second pawl 540, elastically deformed, moves toward the Y2 side with the end 545 as a starting point. The clamping member 5D can be easily removed from the display device 100D by further sliding the clamping member 5D toward the X2 side.

Second Embodiment

Figure 14:
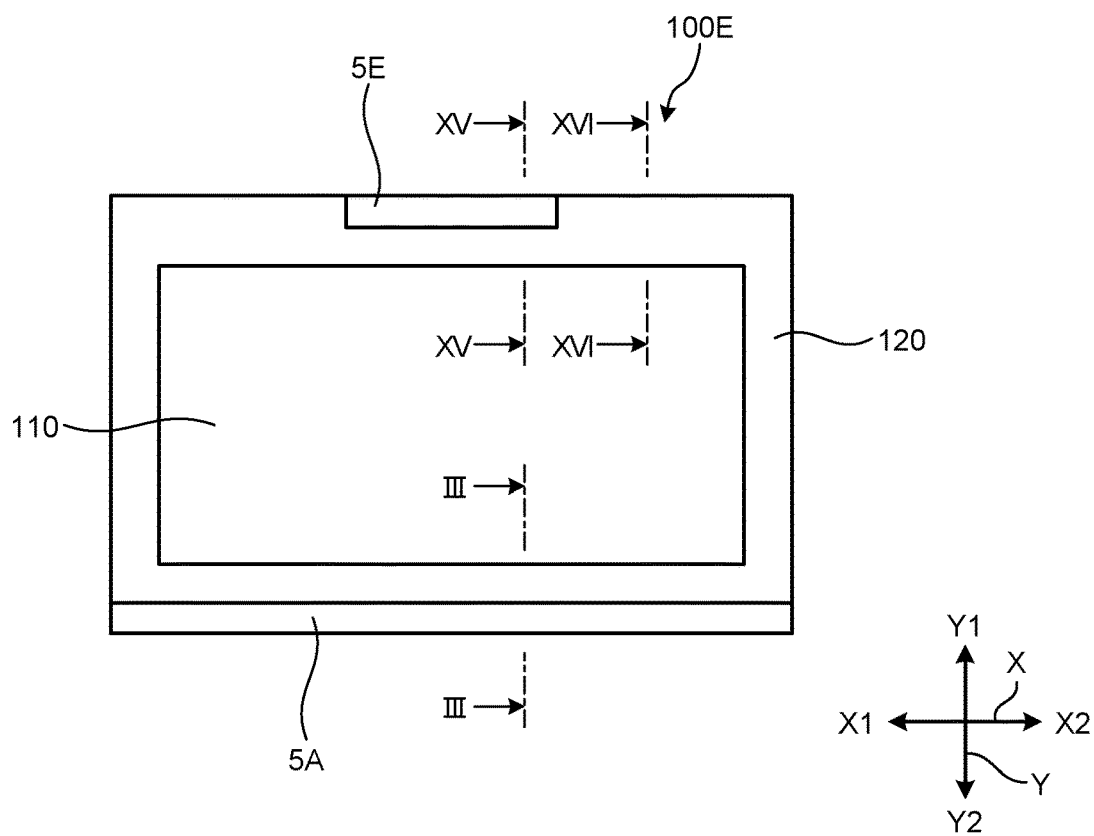
FIG. 14 is a front view of a display device according to a second embodiment.
Figure 15:
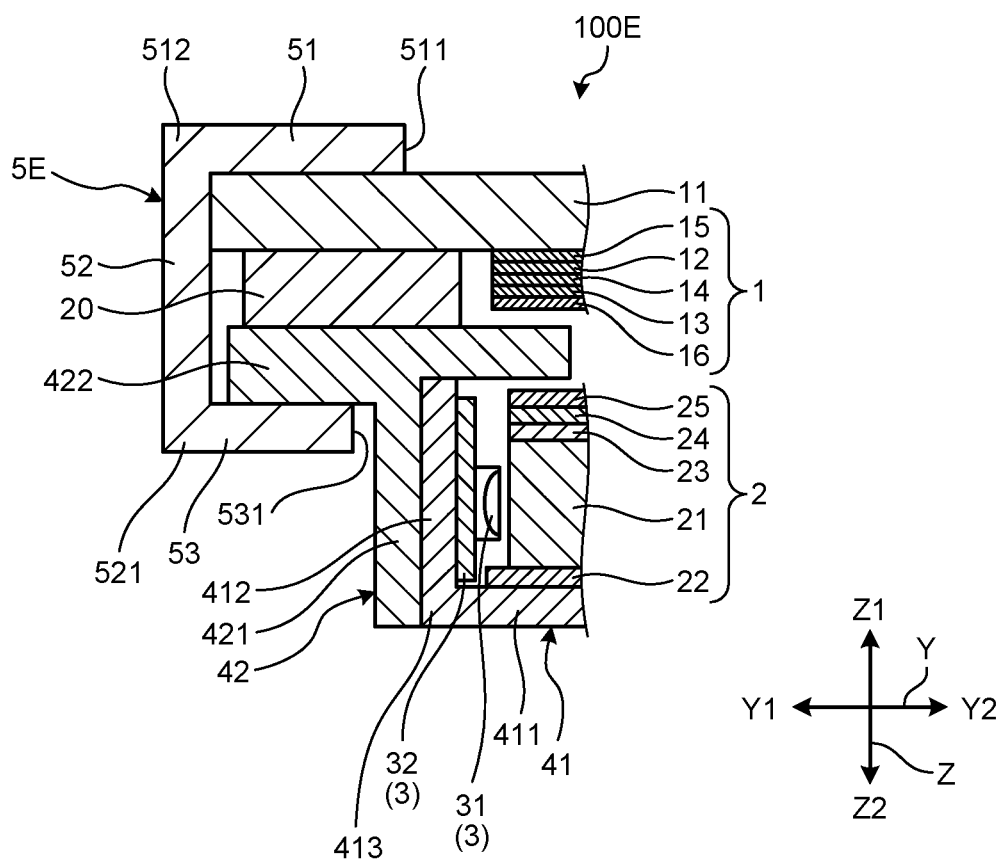
FIG. 15 is a cross-sectional view taken along line XV-XV in FIG. 14.
Figure 16:
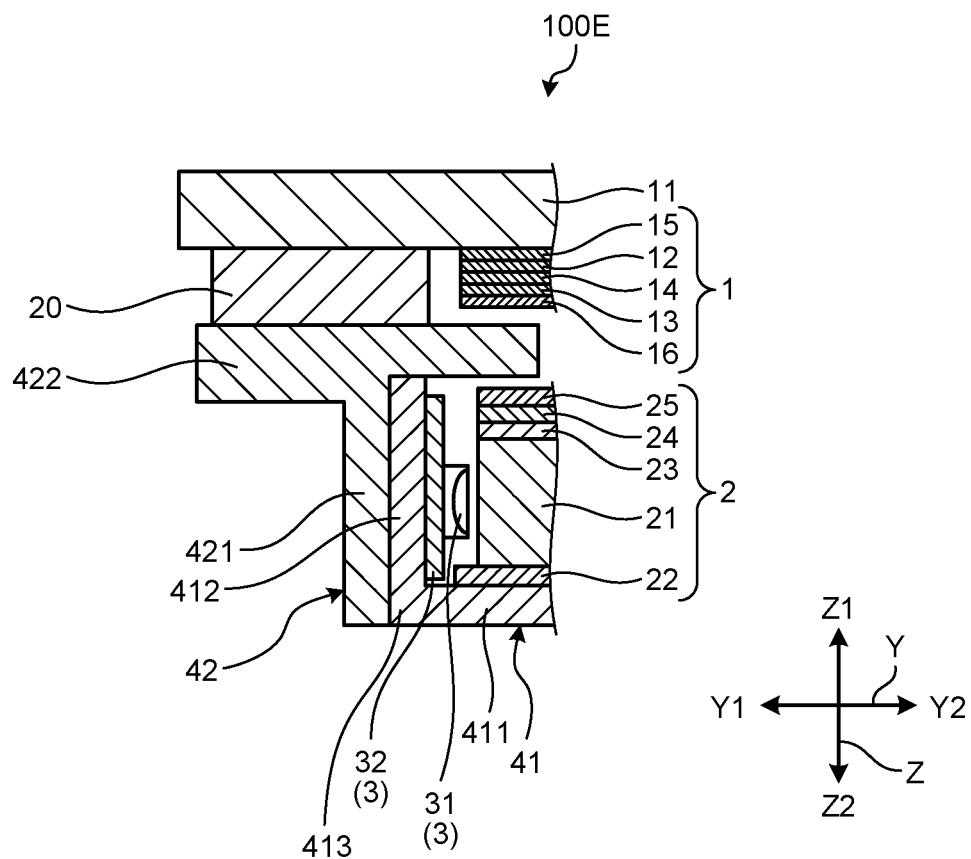
FIG. 16 is a cross-sectional view taken along line XVI-XVI in FIG. 14.

A display device according to a second embodiment will now be described. FIG. 14 is a front view of a display device according to the second embodiment. FIG. 15 is a cross-sectional view taken along line XV-XV in FIG. 14. FIG. 16 is a cross-sectional view taken along line XVI-XVI in FIG. 14.

A display device 100E of the second embodiment differs from the display device 100 of the first embodiment illustrated in FIG. 1 in that the Y1-side clamping member is a clamping member 5E. That is, in the second embodiment, the clamping member 5E is provided at the Y1-side end, and the clamping member 5A is provided at the Y2-side end. The detail will be described below. In the second embodiment, the display panel 1 and the backlight 2 have a flat shape in the same manner as in the first embodiment. The cross section of the Y2-side end is the same as in FIG. 3 and will not be further elaborated.

The clamping member 5E has the same cross-sectional shape as the clamping member 5 but has a smaller length in the X direction than the clamping member 5. The clamping member 5E is an elongated member extending linearly along the left-right direction (X direction). Specifically, as illustrated in FIG. 15, the clamping member 5E has a U-shaped cross section. The clamping member 5 is an elongated member extending lengthwise along the left-right direction (X direction). Specifically, the clamping member 5 has a first section 51, a third section 52, and a second section 53. The first section 51 extends linearly in cross section from an end 311 on the Y2 side toward the Y1 side to an end 512. The third section 52 extends linearly in cross section from the end 512 on the Z1 side toward the Z2 side to an end 521. The second section 53 extends linearly in cross section from the end 521 on the Y1 side toward the Y2 side to an end 531. In FIG. 15, the first section 51 abuts on the front plate 11 but may be separate from the front plate 11. The second section 53 also abuts on the flange 422 of the support member 42 but may be separate from the flange 422.

The section other than the clamping member 5E in the Y1-side end of the display device 100E has the cross-sectional structure illustrated in FIG. 16.

As explained above, the display device 100E according to the second embodiment has the clamping member 5 having the first section 51, the third section 52, and the second section 53 to clamp the front plate 11 and the support member 42, in the same manner as in the first embodiment. Thus, the front plate 11 is less likely to become detached from the support member 42. In particular, in the second embodiment, the clamping member 5E has a smaller length in the X direction than the clamping member 5 and therefore has a smaller weight, leading to reduction of component costs.

Third Embodiment

Figure 17:
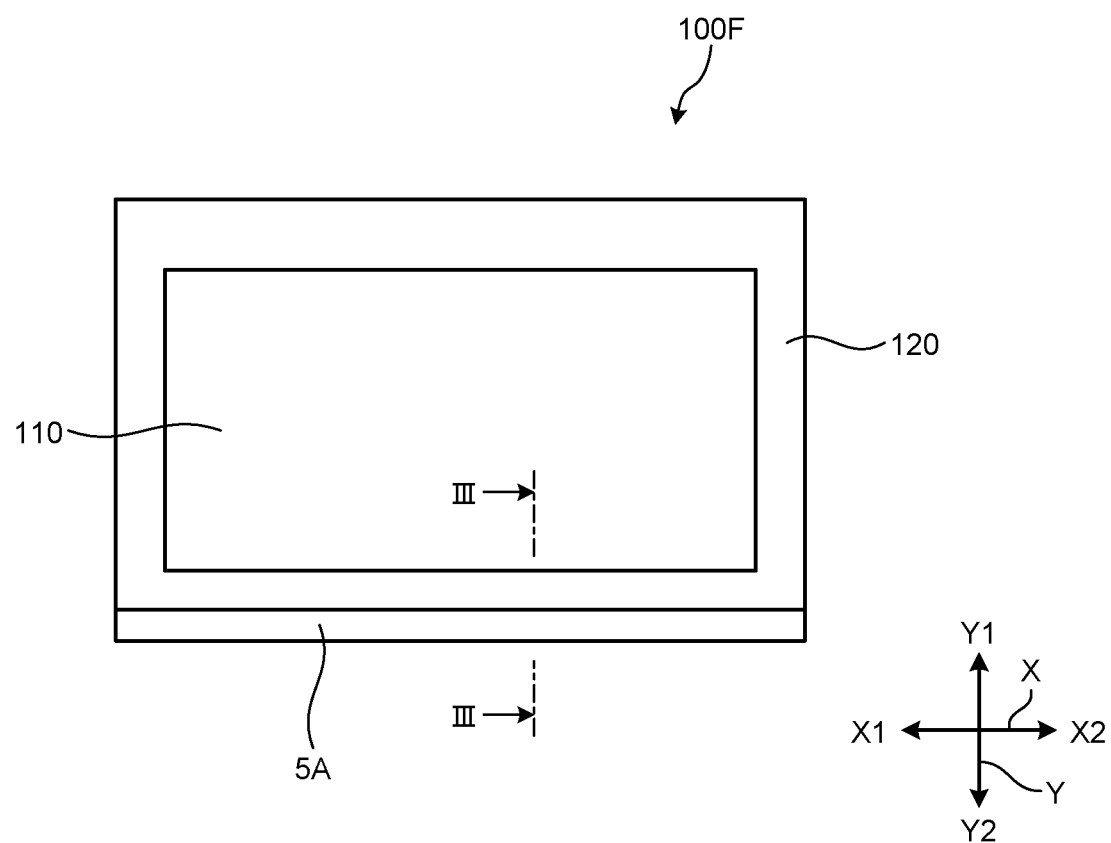
FIG. 17 is a front view of a display device according to a third embodiment.

A display device according to a third embodiment will now be described. FIG. 17 is a front view of the display device according to the third embodiment.

A display device 100F of the third embodiment differs from the display device 100 of the first embodiment illustrated in FIG. 1 in that it does not include a clamping member on the Y1 side. In the third embodiment, the display panel 1 and the backlight 2 have a flat shape in the same manner as in the first and second embodiments.

That is, as illustrated in FIG. 17, the display device 100F of the third embodiment has no clamping member at the Y1-side end and has the clamping member 5A at the Y2-side end. The cross section of the Y2-side end is as described with reference to FIG. 3. The clamping member 5A has the first section 51, the third section 52, the second section 53, the fourth section 54, and the fifth section 55. The fourth section 54 extends linearly in cross section from the end 531 toward the Z2 side to the end 541. The fifth section 55 extends linearly in cross section from the end 541 toward the Y2 side to the end 551. The fifth section 55 is located on the Z2 side of the leg 421 of the support member 42 and the bottom portion 411 of the housing 41.

As explained above, the display device 100F according to the third embodiment has no clamping member on the Y1 side and therefore has a smaller weight than in the other embodiments, leading to reduction of component costs.

Fourth Embodiment

Figure 18:
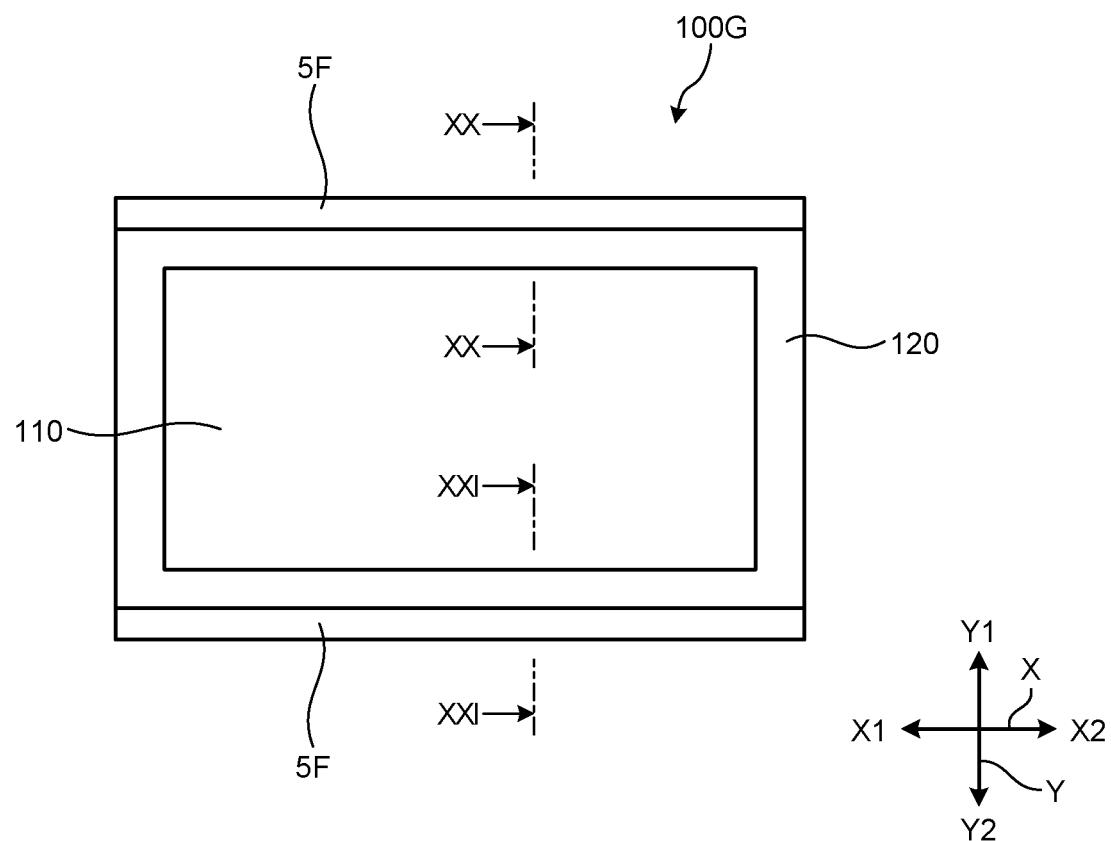
FIG. 18 is a front view of a display device according to a fourth embodiment.
Figure 19:
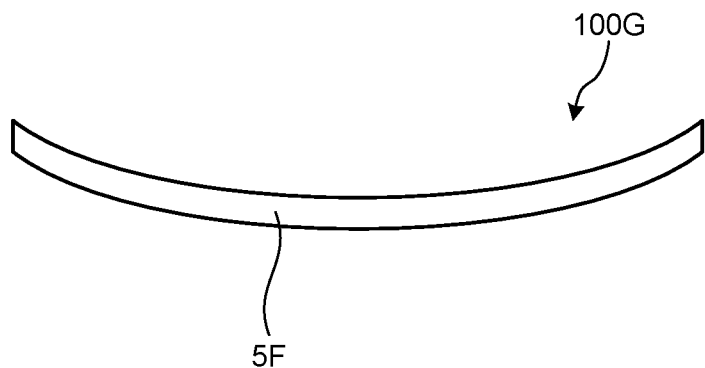
FIG. 19 is a bottom view of FIG. 18.
Figure 20:
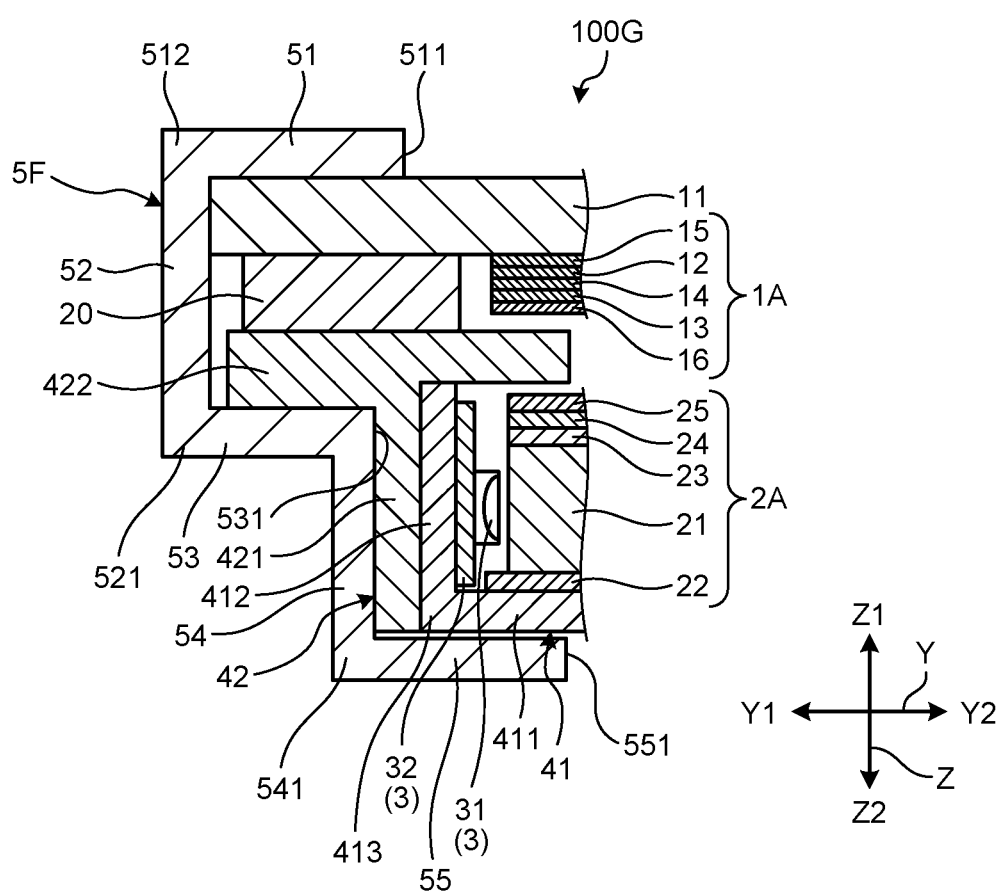
FIG. 20 is a cross-sectional view taken along line XX-XX in FIG. 18.
Figure 21:
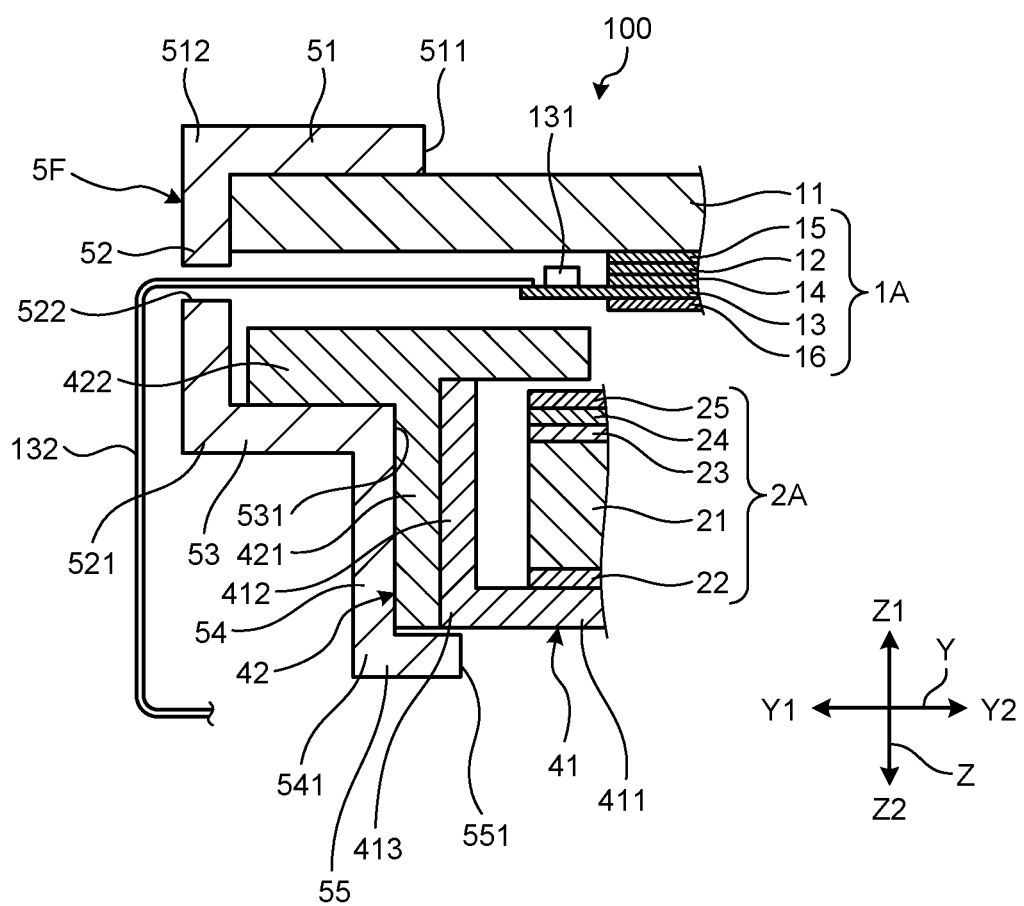
FIG. 21 is a cross-sectional view taken along line XXI-XXI in FIG. 18.

A display device according to a fourth embodiment will now be described. FIG. 18 is a front view of the display device according to the fourth embodiment. FIG. 19 is a bottom view of FIG. 18. FIG. 20 is a cross-sectional view taken along line XX-XX in FIG. 18. FIG. 21 is a cross-sectional view taken along line XXI-XXI in FIG. 18.

Unlike the first embodiment, in a display device 100G of the fourth embodiment, the front plate 11, the display panel 1, and the backlight 2 have a curved surface shape. As illustrated in FIG. 19, clamping members 5F also have a curved surface shape that is curved toward the X direction. The detail will be described below.

A display panel 1A and a backlight 2A illustrated in FIG. 20 and FIG. 21 have a curved surface shape that is curved toward the X direction. Specifically, the display panel 1A and the backlight 2A are concave toward the back surface side (rear side), with the center in the X direction being located closest to the Z2 side, and are curved to come closer to the front surface side (front side) from the center in the X direction toward the left side and the right side (X1 side, X2 side).

As illustrated in FIG. 18, the clamping members 5F are provided at the Y1-side end and the Y2-side end of the display device 100G. The clamping members 5F have a curved surface shape that is curved toward the X direction as described above. Specifically, as illustrated in FIG. 19, each of the clamping members 5F is concave toward the back surface side at the center in the X direction and is curved to come closer to the front surface side from the center in the X direction toward the left side and the right side (X1 side, X2 side).

As explained above, the display device 100G according to the fourth embodiment has the clamping member 5F having a first section 51, a third section 52, a second section 53, a fourth section 54, and a fifth section 55 to clamp the front plate 11 and the support member 42, in the same manner as the clamping member 5A in the first embodiment. In this configuration, even when the display panel 1A, the backlight 2A, and the clamping member 5F are curved, the front plate 11 is less likely to become detached from the support member 42.

Although preferred embodiments of the present disclosure have been described above, the present disclosure is not limited to such embodiments. The disclosure of the embodiments is given only by way of example and susceptible to various modifications without departing from the spirit of the present disclosure. Any modifications made without departing from the spirit of the present disclosure are naturally construed as falling within the technical scope of the disclosure. At least one of various omissions, substitutions, and modifications of the constituent elements can be made without departing from the spirit of the foregoing embodiments and modifications.

What is claimed is:

1. A display device comprising:
a front plate;
a display panel disposed on a back surface side of the front plate;
a backlight disposed on a back surface side of the display panel;
a housing that accommodates the backlight and that extends along an outer side and a back surface side of the backlight;
a support member disposed on the back surface side of the front plate and outside the housing, the support member supporting the front plate, an outer edge of the support member being a flange extending along the front plate; and
a clamping member clamping an outer edge of the front plate and the outer edge of the support member, wherein
the support member includes the flange and a leg extending from the flange toward the back surface side of the backlight,
the clamping member including:
a first section located on a front surface side of the outer edge of the front plate;
a second section located on a back surface side of the flange; and
a third section connecting the first section and the second section;
a fourth section coupled to the second section and located outside the leg of the support member; and
a fifth section coupled to the fourth section and located on a back surface side of the leg, and
the second section of the clamping member is in direct contact with the back surface of the flange.

2. The display device according to claim 1, wherein the second section of the clamping member is coupled to the flange through a first joint mechanism.

3. The display device according to claim 2, wherein the first joint mechanism includes a first pawl provided at the second section and a first through hole provided in the flange and into which the first pawl is capable of fitting.

4. The display device according to claim 1, wherein the fourth section of the clamping member is coupled to the leg through a second joint mechanism.

5. The display device according to claim 4, wherein the second joint mechanism includes a second pawl provided at the fourth section and a second through hole provided in the leg and into which the second pawl is capable of fitting.

6. The display device according to claim 1, wherein
the first section extends in a first direction along a front surface of the front plate,
the second section extends in the first direction,
the third section extends in a second direction crossing the first direction, and
the back surface of the flange extends in the first direction and is in direct contact with a front surface of the second section that extends in the first direction.

* * * * *